Figure 1:
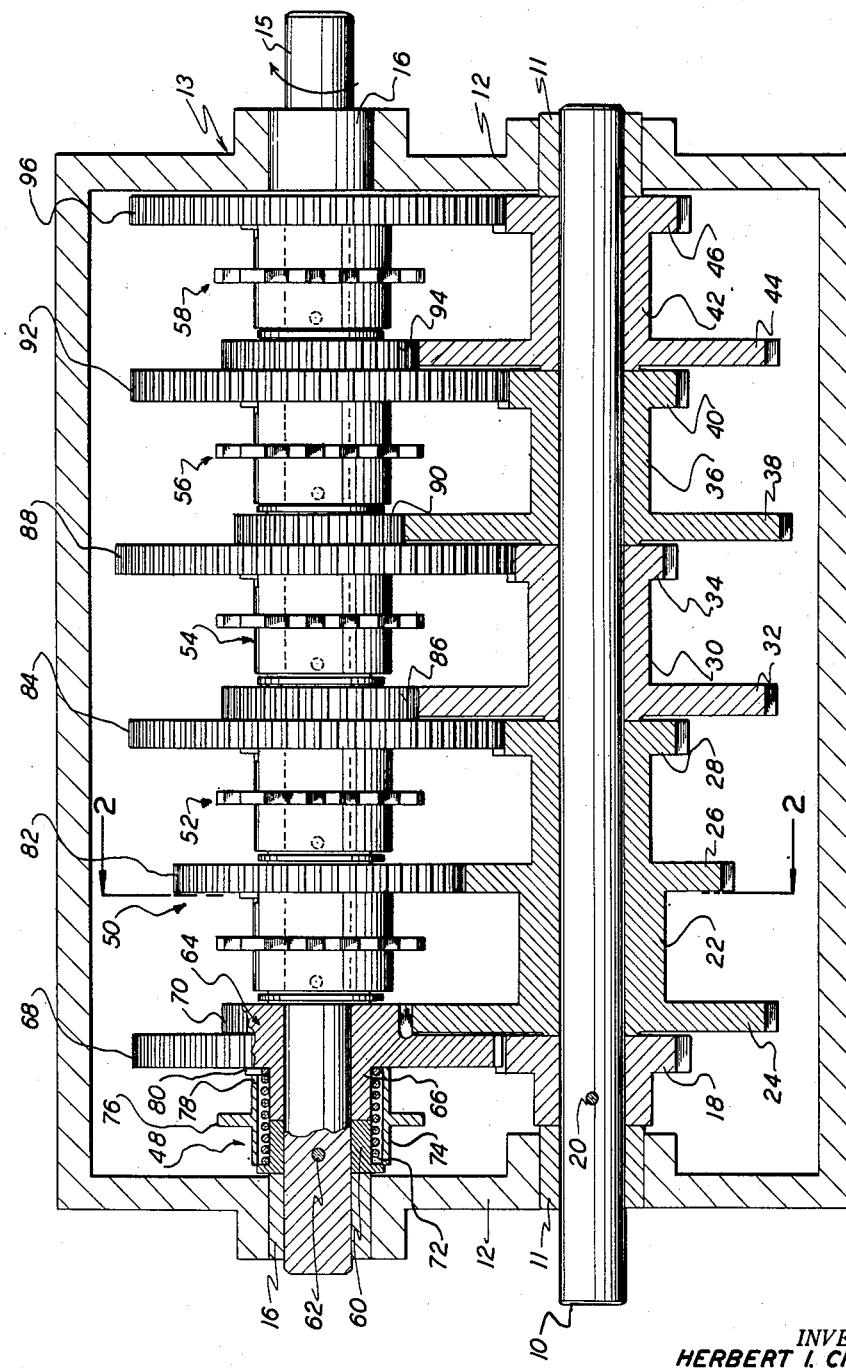

April 22, 1958    H. I. CHAMBERS ET AL    2,831,364
TRANSMISSION CONSTRUCTION

Filed July 17, 1956          2 Sheets-Sheet 1

INVENTORS
HERBERT I. CHAMBERS
ALBERT W. FISCHER
BY
Christie, Parker & Hale
ATTORNEYS April 22, 1958 H. I. CHAMBERS ET AL 2,831,364
TRANSMISSION CONSTRUCTION
Filed July 17, 1956 2 Sheets-Sheet 2

INVENTORS
HERBERT I. CHAMBERS
ALBERT W. FISCHER
BY
Christie, Parker & Hale
ATTORNEYS

United States Patent Office 2,831,364
Patented Apr. 22, 1958

2,831,364

TRANSMISSION CONSTRUCTION

Herbert I. Chambers and Albert W. Fischer, Pasadena, Calif., assignors to Consolidated Electrodynamics Corporation, Pasadena, Calif., a corporation of California Application July 17, 1956, Serial No. 598,460

2 Claims. (Cl. 74—434)

This invention relates to mechanical transmissions for transmitting power from a driving member to a driven member.

Although the transmission system of this invention is applicable to many types of equipment, it is ideally suited to driving precision instruments such as chart recorders, which are operated over a wide range of temperatures. For example, such recorders might be used in oscillograph apparatus which is used in logging wells of high temperature, or in making measurements in aircraft at sub-zero temperature.

For precision work, the oscillograph recorders must be able to withstand extreme temperature changes and operate continuously for long periods with variation in speed accuracies of less than 2%.

One difficulty with conventional transmission systems is that as they are subjected to temperature fluctuations, the dimensions and clearances of the gears used in them also change, giving rise to variation in backlash and in speed developed by the driven member in response to a constant speed for the driving member.

This invention provides a transmission system in which the backlash remains virtually constant over a wide temperature range so that for any given speed of the driving member, the speed of the driven member is the same.

Briefly, the invention contemplates a mechanical transmission system which includes at least two gears, the teeth of one gear being disposed to engage the teeth on the other gear. The gears are made of material having substantially equal coefficients of thermal expansion so that as the gears are subjected to temperature fluctuations, their dimensions change in the same direction and in proportion to their relative sizes so that the transmission system is self compensating.

In the preferred form of the invention the gears are made of the same metal, and the gear teeth surfaces of meshing gears are treated so that the teeth surfaces of one gear are of a different material from the teeth surfaces of the other gear to prevent galling.

In the presently preferred form of the invention the gears are of aluminum, and the meshing surfaces of one of the gears is hard anodized, and the meshing surfaces of the other gears are coated with hard nickel.

Figure 2:
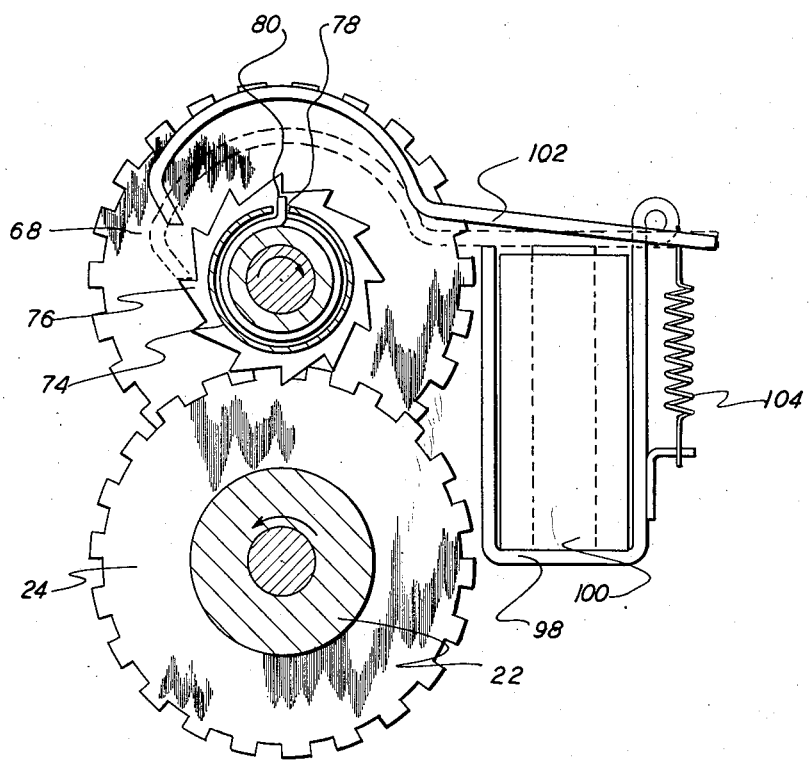

These and other aspects of the invention will be more fully understood from the following detailed description taken in conjunction with the accompanying drawing in which:

Fig. 1 is a vertical section of a typical transmission and housing using this invention; and Fig. 2 is a fragmentary view taken along line 2—2 of Fig. 1 to show a typical control for changing the speed of the driven member of the transmission.

Referring to Fig. 1, a rotatable drive shaft 10 is journaled in bearings 11 mounted in the end walls 12 of a rectangularly shaped transmission housing 13. A rotatable driven shaft 15 is journaled in bearings 16 in the end walls of the housing. The drive and driven shafts are parallel and spaced apart. A drive gear 18 is mounted on the drive shaft adjacent the left hand (as viewed in Fig. 1) end wall of the housing. A pin 20 extends through the gear and drive shaft.

A first gear carrier 22, having a first gear 24, a second gear 26, and a third gear 28 formed integrally at axially spaced positions along its length, is mounted on the drive shaft adjacent the drive gear to be rotatable with respect to the shaft. A second gear carrier 30, having a first gear 32, and a second gear 34 formed integrally at axially spaced positions along its length, is mounted on the drive shaft adjacent the first gear carrier to be rotatable with respect to the shaft. A third gear carrier 36, having a first gear 38, and a second gear 40 formed integrally at axially spaced positions along its length, is mounted on the drive shaft adjacent the second gear carrier to be rotatable with respect to the shaft. A fourth gear carrier 42, having a first gear 44 and a second gear 46 formed integrally at axially spaced positions along its length, is mounted on the drive shaft between the third gear carrier and the inside end of the supporting frame opposite the end at which the drive gear is located. The fourth gear carrier is also rotatable with respect to the shaft.

First, second, third, fourth, fifth and sixth clutch assemblies 48, 50, 52, 54, 56, and 58, respectively, are mounted along the driven shaft inside the supporting frame.

The first clutch assembly typically includes a cylindrical member 60 affixed axially on the driven shaft by a pin 62 so that the member acts as an enlarged diameter portion of the driven shaft. A collar member 64 is mounted rotatably on the driven shaft. The collar member has a cylindrical portion 66 disposed adjacent the cylindrical member, and a first gear 68, and a second gear 70, formed integrally and axially at one end. The diameter of the cylindrical member and the diameter of the cylindrical portion of the collar member are substantially equal. A coil spring 72 is wound about the periphery of the cylindrical member and extends to wind about the periphery of the cylindrical portion of the collar member. A cylindrical spring cover 74 having a sprocket 76 and a slot 78 fits over the coil spring. The coil spring has an upturned end 80 which fits into the slot, and the spring is constructed so that it tends to coil tightly and make a friction fit around the member 60, and portion 66 of collar 64.

All of the six clutch assemblies are alike, with the exception of the number and size of the gears connected on their respective collar members. Therefore, the detailed description of the first clutch assembly is intended as typical of the other five clutch assemblies.

The first and second gears 68, 70 of the first clutch assembly mesh with the drive gear 18 and the first gear 24, respectively, of the first gear carrier 22.

The second clutch assembly has a single gear 82 which meshes with the second gear 26 of the first gear carrier 22.

The third clutch assembly has a first gear 84 and a second gear 86 which mesh respectively with the third gear 28 of the first gear carrier 22 and the first gear 32 of the second gear carrier 30.

The fourth clutch assembly has a first gear 88 and a second gear 90 which mesh respectively with the second gear 34 of the second gear carrier 30 and the first gear 38 of the third gear carrier 36.

The fifth clutch assembly has a first gear 92 and a second gear 94 which mesh respectively with the second gear 40 of the third gear carrier 36 and the first gear 44 of the fourth gear carrier 42.

The sixth clutch assembly has a single gear 96 which meshes with the second gear 46 of the fourth gear carrier 42.

In operation, the drive shaft 10 receives its input from any suitable means such as an electric motor (not shown). When turned in the counterclockwise direction (as viewed in Fig. 2), the drive shaft rotates the drive gear 18 in the same direction.

The drive gear rotates the collar member of the first clutch assembly in the clockwise direction (as viewed in Fig. 2) at a speed determined by the gear ratio between the drive gear and the first gear of the first clutch assembly. The second gear of the first clutch assembly rotates the first gear carrier in the counterclockwise direction at a speed determined by the gear ratio between the second gear of the first clutch assembly and the first gear carrier. This mechanical analysis may be carried out through the entire train of gears. The result is that the collar member of each of the six clutch assemblies is driven in the clockwise direction by the drive shaft, which is a common rotatable member coupled to the collar members by the various gears. Speed is determined by the various gear ratios between the drive shaft and the respective collar members.

By holding the cylindrical spring cover 74 of the first clutch assembly stationary, the upturned end 80 of the coil spring 74 will prevent the spring from rotating, causing the spring to tend to unwind from around member 60 and portion 66 of collar 64. Thus, no rotary movement will be transmitted from the collar member of the first clutch assembly to the driven shaft. This operation is typical of all six of the clutch assemblies.

Six different rotational speeds are available, a different speed from each collar member of each of the six clutch assemblies. To engage the driven shaft at any one of these speeds, the spring cover of a selected clutch assembly is released which allows the coil spring of that clutch assembly to tighten and transmit rotary movement from the collar member to the driven shaft.

Fig. 2 shows a typical control arrangement which may be used to control the action of the various clutches.

The control means includes a frame 98 housing a solenoid 100. A pawl member 102 is pivoted to the frame and held up from the solenoid by an auxiliary spring 104. When the solenoid is actuated, the pawl is urged toward the solenoid and engages the sprocket 76 of the cylindrical spring cover 74 preventing rotation of the spring cover. The upturned end 80 of the coil spring 72, being caught in the slot 78 of the spring cover, prevents rotation of the coil spring causing the coil spring to tend to unwind and loosen its grip. When the solenoid is de-activated, the auxiliary spring 104 pulls the pawl out of engagement with the sprocket, allowing the spring cover to rotate and the coil spring to tighten its grip.

A control means identical to that of Fig. 2 is utilized in conjunction with each of the clutch assemblies, and permits of an electric push-button control for changing the output rotary speeds of the transmission.

It is to be understood that by reversing the winding of the coil springs, the transmission can be run in the opposite direction. Also, the number of speeds available may be increased by supplying additional gears and clutch assemblies.

The gears and housing shown in Figs. 1 and 2 may be made of a great variety of material. A satisfactory transmission of the type just described was made using an aluminum alloy known to the trade as 75 ST-6 for the housing and all of the gears and gear carriers. The gears and gear carriers mounted on the drive shaft were hard anodized by a process outlined in the Aluminum Company of America Bulletin No. 6, dated January 1955, and entitled "Martin Hard Coating." The gears and gear carriers on the driven shaft were coated with a hard nickel plating by a chemical reduction process which is described in Chem Plate Corporation Data Sheet No. 101. The nickel plate coating has a hardness of 450 vickers minimum, and a composition of 93% nickel and 7% phosphite. The gears coated by these two processes had excellent contact compatibility with minimum wear. Each of the gears were given coatings of equal thickness (about .002) to allow identical mechanical tolerance on mating gears.

The drive and driven shafts were both made from hard steel which was compatible with both the hard anodized and hard nickel coatings, providing good bearing surfaces for the gear carriers adapted to rotate on the shafts.

When the transmission system constructed as just described was subjected to wide temperature fluctuations, its backlash characteristic remained constant and its variation in speed accuracy was less than 2%. The reason for this good performance is that thermal expansion or contraction of the housing was compensated by the physical changes in the gears.

We claim:

1. A mechanical transmission system which includes at least two gears, the teeth of one gear being disposed to engage the teeth on the other gear, the gears being of aluminum to have substantially equal coefficients of thermal expansion, the teeth surfaces of one gear being hard anodized, and the teeth surfaces of the other gear being coated with a hard nickel plate.

2. A mechanical transmission system which includes an aluminum housing, a rotatable drive shaft journaled in the housing, a rotatable driven shaft journaled in the housing, an aluminum drive gear mounted on the drive shaft, an aluminum driven gear mounted on the driven shaft and disposed to mesh with the drive gear, the teeth surfaces of one gear being hard anodized, and the teeth surfaces of the other gear being coated with a hard nickel plate.

References Cited in the file of this patent

UNITED STATES PATENTS

| | | |
|---|---|---|
| 2,183,667 | Buckendale | Dec. 19, 1939 |
| 2,541,790 | Sugden et al. | Feb. 13, 1951 |